March 1, 1960  R. WILTON  2,927,270
ELECTRICAL TEST INSTRUMENT
Filed Sept. 7, 1956  2 Sheets-Sheet 1

INVENTOR.
Robert Wilton
BY Ooms, McDougall,
Williams and Hersh
Attorneys

INVENTOR.
Robert Wilton

United States Patent Office 2,927,270
Patented Mar. 1, 1960

2,927,270

ELECTRICAL TEST INSTRUMENT

Robert Wilton, London, Ontario, Canada, assignor to American Gage & Machine Company, Chicago, Ill., a corporation of Illinois Application September 7, 1956, Serial No. 608,507

3 Claims. (Cl. 324—73)

This invention relates to test instruments for use in alternating-current applications, and is in particular addressed to a novel test instrument which is capable of measuring frequency, power factor, and distortion, as well as performing the conventional functions of measuring voltage and current.

The instrument of the present invention has extraordinary versatility, being also, if desired, adaptable to provide a constant-amplitude A.-C. reference potential, useful in many applications.

One of the objects of the present invention is to provide a simple portable test instrument, conveniently usable with A.-C. circuits, by means of which a direct reading of circuit power factor can be procured.

Another object of the present invention is to provide, in a simple portable test instrument, apparatus permitting direct indication of the frequency of the alternating current flowing in a test circuit.

A further object of the present invention is to provide, in a simple portable test instrument, means for obtaining a direct indication of the percentage of waveform distortion present in an A.-C. circuit under observation.

A still further object of the present invention is to provide, in a simple and compact test instrument, an accurate constant-amplitude A.-C. reference potential.

Other objects and advantages of the present invention will appear from the following detailed description of a typical embodiment.

Figure 3:
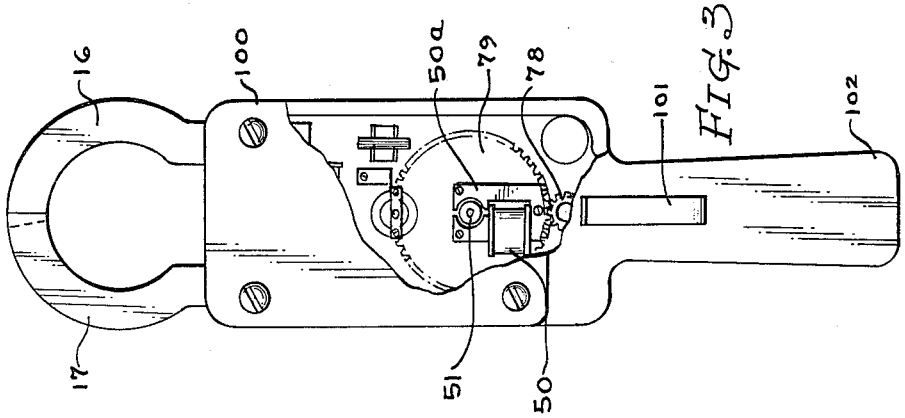
Figure 2:
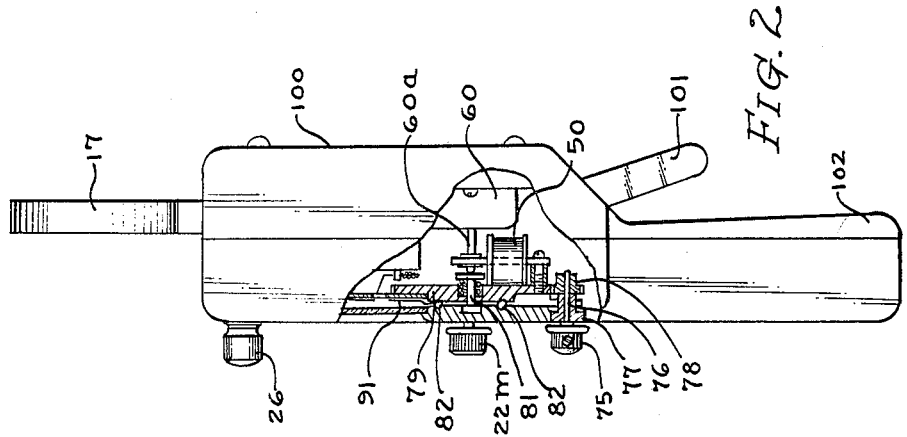
Figure 1:
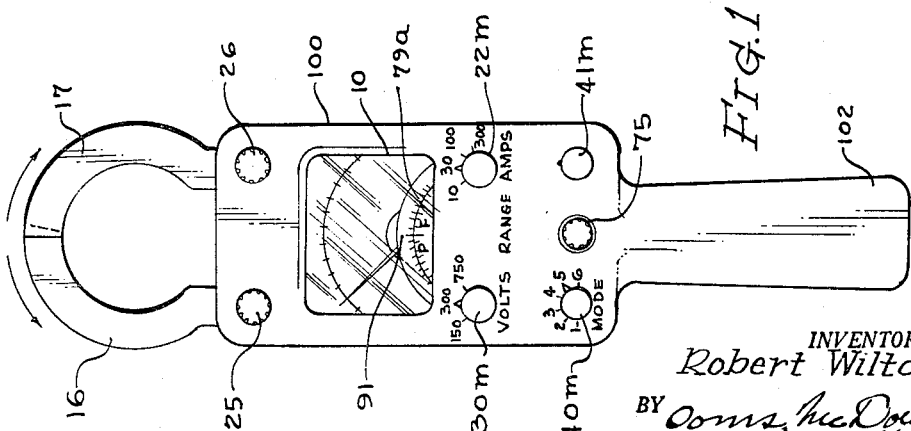
Figure 4:
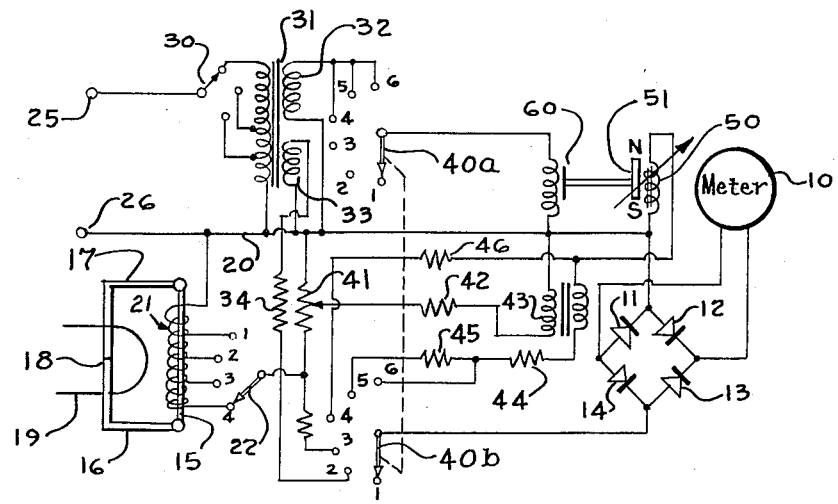
Figure 5:
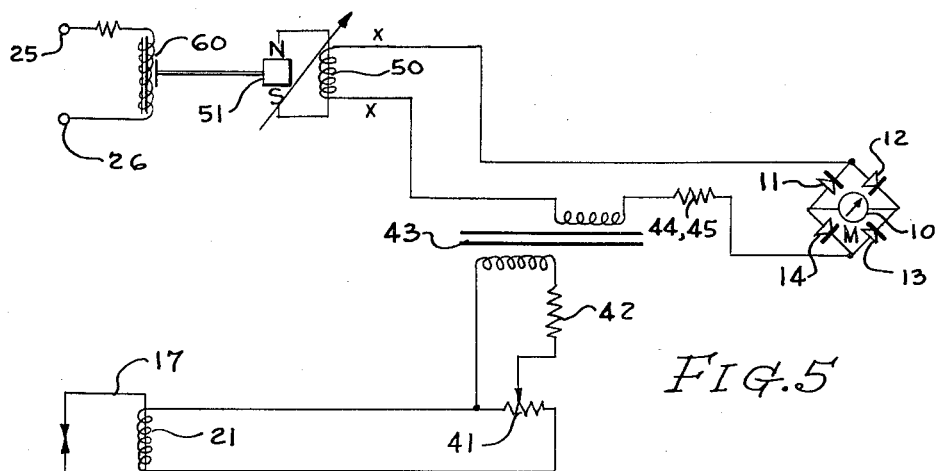
Figure 6:
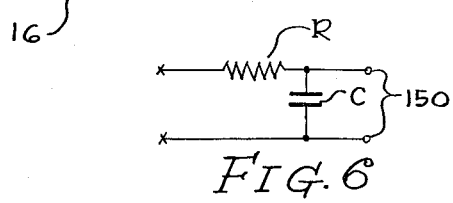

In the drawing, Fig. 1 is a front elevation view of a typical test instrument made in accordance with my invention, the instrument being in this case of the type popularly known as a "tong tester," in which current can be measured by clamping a transformer around the conductor under observation, making it unnecessary to disconnect the conductor during measurement. Fig. 2 is a side elevation view of the Fig. 1 instrument, a portion of the casing being shown cut away to bring out the internal structural details. Fig. 3 is a similar rear elevation view of the Fig. 1 instrument, with a portion of the back part of the casing similarly cut away. Fig. 4 is an illustrative schematic diagram suitable for use in the test instrument of Fig. 1. Fig. 5 is a simplified schematic diagram showing the circuit of the Fig. 1 test instrument when it is connected for measurement of power factor or waveform distortion. Fig. 6 is a fragmentary schematic diagram showing how the circuit of my test instrument may be modified to provide an externally available constant-amplitude reference potential in case that feature is desired.

To provide at the outset an understanding of the electrical principles of my invention, I shall discuss first the schematic diagrams of Figs. 4 and 5, before describing the structural features of the invention as set forth in Figs. 1–3.

Like most test instruments, my invention is built around a moving-coil meter of the d'Arsonval type, designated in Figs. 4 and 5 by the reference numeral 10. With the meter 10 are associated a plurality of rectifier elements connected in a bridge circuit and respectively designated 11, 12, 13 and 14. The terminals of meter 10 are connected to opposite corners of the bridge circuit which comprises the rectifiers.

The rectifier units may be of any suitable conventional type. Disc rectifiers of the copper-oxide type are usually used in such applications.

I provide, for current-measuring purposes, a magnetic core element 15 which includes a pair of mechanically tiltable legs or "tongs" 16 and 17. These tongs, when closed, have a meeting face 18 which provides a closed magnetic circuit through the core element 15. They may, however, be opened so as to permit them to be closed around a current-carrying conductor to be studied, illustrated schematically in Fig. 4 and designated by the reference numeral 19.

Around core member 15 I provide a tapped winding 21, one terminal of which is connected to a common bus 20, and the other terminal of which is connected to the end contact of a multi-position rotary switch 22. The taps of winding 21 are respectively connected to the other contacts of switch 22. Switch 22 is a range-selector switch for measurement of currents, and the taps on winding 21 are chosen to provide convenient full-scale values for the meter 10.

Voltage measurement is accomplished by applying the unknown voltage to a pair of input terminals 25 and 26, 26 being connected to common bus 20. Terminal 25 is connected to the movable arm of a voltage range-selector switch 30, which in the embodiment shown in the drawing is a single-pole, 3-position rotary switch. The contacts associated with the switch arm as shown in the drawing are respectively connected to one terminal and the taps on the primary winding of a transformer 31, the other primary terminal being connected to common bus 20. Transformer 31 has secondary windings 32 and 33, one terminal of each being connected to common bus 20. The other terminal of winding 32 is connected to terminals 4, 5 and 6 of a mode-selector switch 40a, which, in the illustrated embodiment, is of the 6-position rotary type. The other terminal of winding 33 is connected through resistor 34 to contact No. 2 of mode-selector switch 40b, which is also a 6-position rotary switch similar in structure to switch 40a and mechanically ganged with it.

Transformer 31 and its taps may be designed to give whatever voltage ranges are desired. In a typical instrument used in power work, full-scale ranges of 150 volts, 300 volts, and 750 volts may be found desirable.

A potentiometer 41 is connected between the arm of switch 22 and the common bus 20, the arm of switch 22 being also connected to contact No. 3 of mode-selector 40b.

The movable arm of potentiometer 41 is connected through a current-limiting resistor 42 to one terminal of the primary coil of a transformer 43, the other terminal of the primary coil being connected with common bus 20. One terminal of the secondary coil of transformer 43 is connected through resistor 44 to contact No. 6 of switch 40b, and contact No. 6 in turn is connected to contact No. 5 of the same switch through resistor 45. The other terminal of the secondary winding of transformer 43 is connected through resistor 46 to contact No. 4 of switch 40b. The last-mentioned terminal of the secondary winding of transformer 43 is also connected to one terminal of the field winding 50 of an A.-C. generator, the rotary armature of which is a permanent magnet 51. The other terminal of winding 50 is connected to common bus 20.

This A.-C. generator 50—51 forms a very important part of my invention and will be discussed in greater detail in a subsequent paragraph.

The armature 51 is mechanically driven by a synchronous motor 60, one terminal of which is connected to the common bus 20 and the other terminal of which is connected to the movable arm of switch 40a. Synchronous motor 60 also forms an important part of my invention and will be discussed in greater detail later.

The corner of the bridge-rectifier circuit between rectifiers 11 and 12 is connected to common bus 20, and the opposite corner, which is the junction between rectifiers 13 and 14, is connected to the movable arm of switch 40b.

It should be noted that the symbolic representation of A.-C. generator 50—51 in Figs. 4 and 5 carries an arrow indicating adjustability. This symbol indicates that the physical orientation of the field winding 50 can be rotated mechanically, thus providing a precise and accurate mechanism for shifting the phase of the voltage induced in coil 50 by the rotating magnet 51 without affecting the frequency, waveform, or amplitude of the induced voltage. The means by which this is mechanically accomplished in the illustrated embodiment will be brought out in the discussion of Figs. 1–3 which follows.

As indicated by the arrows in Fig. 1, the "tongs" or movable magnetic core members 16 and 17 will normally be movably mounted at one end of the casing 100. A suitable actuating lever 101 may be mounted behind the handle 102 and mechanically linked in any desired manner (not shown) to permit the separation and clamping together of the tong members 16 and 17 at the will of the operator.

The meter 10 will normally be mounted in a central location on the face of the casing. The voltage-input terminals 25 and 26 may be mounted as shown near the upper portion of the casing.

The face of the casing will also carry the manual knob 30m for controlling switch 30, knob 22m for controlling switch 22, and knob 40m for controlling switches 40a and 40b. A knob 41m is also provided on the panel for control of potentiometer 41.

At a suitable place on the lower face of casing 100 I provide a manual knob 75 which is keyed to a shaft 76. Shaft 76 is journalled in a suitable bearing 77 and carries on its inner end a gear 78 rigidly connected to shaft 76 for rotation with it. Gear 78 meshes with a relatively large gear 79 made preferably of non-magnetic material, gear 79 being mounted for rotation on a shaft 81 and being provided with anti-friction bearings 82.

Mounted on the inner face of gear 79 is the field coil 50 heretofore referred to. Field coil 50, with its associated magnetic core 50a, is so formed and positioned on the gear 79 as to define a cylindrical space between the poles of core 50a and surrounding the axis of gear 79, the permanent-magnet armature 51 being mounted for rotation therewithin. Armature 51 is secured to the shaft 60a of synchronous motor 60 for rotation therewith.

As may be best understood by reference to Fig. 3, rotation of knob 75 will cause the entire field assembly 50, 50a to rotate around the armature 51 without shifting its position relative thereto in any other respect.

As may be best seen from Figs. 1 and 2, I provide on the upper front face of gear 79 a graduated scale 79a which is vissible in the transparent window through which the scale of the meter 10 may be viewed. Scale 79a cooperates with a fixed hairline or pointer 91 suitably mounted in front of gear 79. Scale 79a may, if desired, be calibrated in terms of power factor or it may be calibrated in terms of phase angle. In either case, distinction between a leading and lagging phase angle may be indicated by using markings of different colors or by appropriately labelling the respective halves of scale 79a.

Synchronous motor 60 is a motor of the familiar type in which the shaft rotates once for each cycle of applied current. While all synchronous motors have the characteristic, under light load, of "locking in" in a more or less definite phase relation to the applied current, some synchronous motors available on the market are specifically designed to provide a constant phase relation between shaft position and applied current within an error of less than 1°. Since the accuracy of phase-angle measurement with my instrument depends in part on the constancy of the phase relation between motor shaft position and applied current, it is desirable that motor 60 be of a type having good characteristics in this respect.

Persons skilled in the art will realize that, when a suitable current is applied to synchronous motor 60, a voltage will be induced across the generator winding 50 having the same frequency as that of the current supplied to motor 60 and having amplitude proportional to the frequency. During the initial adjustment of my instrument at the factory, the angular position of armature 51 on the shaft of motor 60 should be adjusted so that the induced voltage across coil 50 is precisely in phase with the voltage applied to motor 60 when gear 79 is at "center" position—that is, at the position whereat scale 79a indicates zero phase angle or unity power factor, as the case may be.

This initial adjustment having been made subsequent manual adjustment of knob 75 will, by rotating core element 50a relative to the armature 51, shift the phase of the voltage induced across coil 50 in direct linear relation to the angle through which gear 79 is rotated. That is, a rotation of gear 79 through an angle of 30° will produce a 30° phase shift in the voltage across coil 50. This shift may be either leading or lagging, depending on the direction of rotation of gear 79 from its "center" or zero-angle position.

I shall now describe the operation of the illustrated embodiment of my invention. The mode-selector switches 40a and 40b, which are manually controllable by means of knob 40m, have 6 positions. Position No. 1 is the "off" position. Position No. 2 is the position for measurement of voltage; position No. 3 adjusts the circuit for measurement of current. Position No. 4 is the position used when measurement of frequency is desired. Position No. 5 is the position for measuring power factor, and position No. 6 is the position used for measurement of waveform distortion. In the following discussion, I shall successively describe the operation of the instrument in each of the selector positions 2–6 inclusive.

In position No. 2, for voltage measurement, the instrument is essentially a conventional A.-C. volt meter. The voltage being measured is applied across the appropriate portion of the primary of transformer 31, as selected by switch 30, and the induced voltage across secondary winding 33 is applied through current-limiting resistor 34 to the measuring circuit comprising meter 10 and its associated bridge rectifier. The meter 10 may have a series of voltage scales, calibrated to correspond to the range positions of switch 30. Normally these voltage scales will be marked to read the R.M.S. value of sinusoidal voltages.

Similarly, in position No. 3 of the mode-selector switch, the instrument functions essentially as a conventional "tong" type of A.C. ammeter. That is, in position No. 3, the current flowing through external circuit 19 induces voltages across coil 21, which are applied to meter 10 and read in substantially the same manner as in the voltage-measuring position No. 2. The magnitude of the induced voltage across coil 21 is of course proportional to the magnitude of current flowing in external circuit 19, so that meter 10, on its current-indicating scales, may be appropriately calibrated.

In position No. 4, my instrument will provide a direct measurement of the frequency of an applied A.-C. voltage. In making this measurement, the knob 40m is placed in its No. 4 position, switch 30 is placed on the appropriate voltage range, and the voltage source being examined is bridged across input terminals 25 and 26. Motor 60 starts, turning at a speed equal to the frequency; that is, if the applied voltage has a frequency of 60 cycles per second, the speed of motor 60 will be 3600 r.p.m., and so on. The voltage induced across generator winding 50 will, by familiar electric laws, be proportional in amplitude to the speed of rotation of armature 51 and hence will be proportional to the frequency of the voltage source applied to terminals 25 and 26. In position No. 4, the voltage induced across coil 50 is applied to and measured by the meter 10, so that meter 10 may be provided with a frequency scale calibrated directly in cycles per second.

The frequencies normally encountered in power work range downward from 60 cycles per second, and use of my instrument as herein disclosed on such frequencies is fully practical. If use of the instrument is to involve work with sources having frequencies of the order of 400–800 cycles per second, such as are sometimes encountered in aircraft work, it will be desirable to use a synchronous motor designed for slower rotational speed than one turn per cycle.

Power factor may be measured by placing the mode-selector switch in position No. 5. For this purpose, the input terminals 25 and 26 are bridged across the voltage source whose power factor is to be measured, and the tongs 16, 17 are closed around a conductor carrying the current whose phase angle is to be measured. It will be understood, of course, that the range-selector switches 22 and 30 will be set at appropriate positions.

Fig. 5 shows a simplified circuit of my test instrument in the Fig. 5 mode-selector setting. The reference numerals in Fig. 5 are the same as those in Fig. 4, and the reader may find it easier to follow my description of the instrument's operation in power-factor measurement if he follows the simplified circuit of Fig. 5.

The A.-C. generator 50, 51 develops an A.-C. voltage identical in frequency with the supply voltage and in time phase with the supply voltage when gear 79 is set at its zero or center position. This induced voltage is connected in series opposed relation with the voltage developed across the secondary coil of transformer 43, that voltage being substantially in phase with the current flowing in the external circuit 19. (To reduce to a negligible amount phase shifts resulting from adjustment of potentiometer 41, the resistor 42 is used, being sufficiently large to render the load on coil 21 essentially resistive regardless of the position of the movable arm of potentiometer 41.)

The resultant of the induced voltage across coil 50 and the induced voltage across the secondary winding of transformer 43 is applied to meter 10 through its associated bridge rectifier. Since these voltages are added in opposition, they will wholly cancel if (1) they are equal in amplitude, (2) they are identical in phase, and (3) they have the same waveform. When, therefore, the instrument is first set for power-factor measurement, the potentiometer 41 and the phase-control knob 75 are adjusted to achieve a null on meter 10. When a minimum is reached, the phase angle or power factor may be read directly from scale 79a.

The waveform of the induced voltage across coil 50 can be made sinusoidal to a very high degree of accuracy. If the waveform of the current through external circuit 19 is likewise sinusoidal, a substantially perfect null will be achieved by proper adjustment of potentionmeter 41 and phase-control knob 75. If, on the other hand, no such complete null can be obtained, it will be a clear indication that the waveform of the current under observation is not sinusoidal, but contains harmonic distortion. (The presence of harmonic distortion in the current under observation will not substantially affect the power-factor measurement, since in any case a distinct minimum reading will be obtainable on the meter 10 when the amplitudes of the opposed voltages in coil 50 and the secondary of transformer 43 are equal and their phase angle is zero.)

For accurate measurement of the quantity of harmonic distortion in the current under observation, the selector switch 40a, 40b may be shifted to position No. 6. In this position, the circuit arrangement is the same as in position No. 5 except that multiplier resistor 45 is cut out of the circuit, so that the sensitivity of meter 10 is greatly increased. In other words, a quantity of residual current in meter 10 that would show only a small meter deflection in position No. 5 will give a substantially greater deflection when the mode-selector switch is in position No. 6. A "distortion" scale on meter 10 may be suitably calibrated to give a direct reading on meter 10 of percentage distortion when the instrument is being operated in position No. 6. For thus measuring distortion, the minimum reading on meter 10 should first be achieved with the mode-selector switch in position No. 5, the switch should then be shifted to position No. 6, and knobs 75 and 41m should then be carefully readjusted to obtain the best possible null with the meter in its more sensitive setting. Once the lowest available reading in position No. 6 has been obtained, the percentage distortion in the waveform of the current under observation can then be read directly off the distortion scale on meter 10.

I have previously mentioned that my test instrument may, if desired, be used as a source of a constant-amplitude A.-C. reference potential. This can be done by providing on the instrument a pair of terminals permitting external access to the induced voltage across coil 50 at the points indicated by the letters (x) on Fig. 5. The potential thus provided will be proportional to the frequency of the voltage source applied to terminals 25 and 26, and, as is well known, the frequency of A.-C. power sources is usually held constant to far higher degree of precision than is the terminal voltage. Thus, without any further refinements, the potential at the points "x" will usually be constant within a very narrow margin of error.

Should it be desired to obtain a potential source of amplitude even more nearly constant than the frequency of the applied voltage source, this can be achieved by interposing between the points "x" and the constant-potential output terminals a resistance-capacitance network of the sort shown in Fig. 6. In that figure, the constant-potential output is taken across capacitor C, the output terminals being designated 150. If the impedance of the series resistor R at the nominal frequency is substantially greater than the impedance of the capacitor C at that frequency, the potential across C will tend to vary inversely with the applied frequency. Since the amplitude of the induced voltage across coil 50 is directly proportional to the frequency of the voltage source, the net voltage registered across capacitor C will under those circumstances be constant to a very high degree of precision, being virtually unaffected by such small deviations in the source frequency as may take place.

While I have in this specification described in considerable detail a typical embodiment of my invention, it should be understood that the description is exemplary, and that the principles of my invention may be used by persons skilled in the art in equipment differing widely in structural and circuit details from the particular apparatus described. It is therefore my desire that the scope of the invention be determined primarily by reference to the appended claims.

I claim:

1. In a portable A.-C. test instrument comprising a voltage-responsive input means, a current-responsive input means, an indicating meter, a multiple-position switch, and circuit means interconnecting such components and operative in one selected switch position to indicate on said meter the voltage sensed by said first input means and operative in another selected switch position to indicate on said meter the current sensed by said other input means, the improvement comprising a synchronous motor, an A.-C. generator having a field element and an armature element, one of said elements being mechanically coupled to said motor for rotation thereby, means manually controllable from the exterior of said test instrument for shifting the angular position of said other element and thereby shifting the phase of the voltage developed by said generator, said means comprising a calibrated dial readable externally of said instrument, and circuit means comprising a variable impedance element interconnecting said meter, said generator, said motor, both of said input means, and said switch, said switch being operative in a third selected position of said switch to connect said motor to said first input means and to apply to said meter, in series opposition, a voltage derived from said generator and a voltage derived from said second input means, said variable impedance element being manually adjustable to equalize the magnitudes of said last-mentioned voltages.

2. Apparatus in accordance with claim 1 wherein the sensitivity of said meter, when said switch is placed in a fourth selected position, is much greater than its sensitivity in said third switch position, the circuit connections in said fourth switch position being otherwise similar to those in said third switch position, said meter being provided with a scale calibrated to indicate wave-form distortion.

3. Apparatus in accordance with claim 1 having additional circuit means interconnecting said switch, said generator, and said meter, operative in still another selected position of said switch to apply the output voltage of said generator to said meter for producing thereon an indication proportional to the magnitude of such output voltage.

References Cited in the file of this patent
UNITED STATES PATENTS

| | | |
|---|---|---|
| 1,401,654 | Shepard | Dec. 7, 1921 |
| 2,200,103 | Shutt | May 7, 1940 |
| 2,271,991 | Rich | Feb. 3, 1942 |
| 2,460,095 | Love | Jan. 25, 1949 |
| 2,542,638 | Desch | Feb. 20, 1951 |
| 2,551,291 | Rich | May 1, 1951 |
| 2,577,992 | Armstrong | Dec. 11, 1951 |
| 2,617,588 | Dobbins | Nov. 11, 1952 |